United States Patent [19]
Smith et al.

[11] Patent Number: 5,888,447
[45] Date of Patent: Mar. 30, 1999

[54] SELF-EXTINGUISHING BURNING BAR

[75] Inventors: W. G. Neil Smith, Burlington; Gregory J. Saunders, Sault Ste. Marie, both of Canada

[73] Assignee: WGNS Investments Inc., Ontario, Canada

[21] Appl. No.: 814,518

[22] Filed: Mar. 10, 1997

[51] Int. Cl.⁶ ..................................................... B23K 7/00
[52] U.S. Cl. ............................................. 266/48; 148/198
[58] Field of Search .............................. 266/48; 148/198; 219/15

[56] References Cited

U.S. PATENT DOCUMENTS

| | | | |
|---|---|---|---|
| 4,114,863 | 9/1978 | Campana | 266/48 |
| 4,182,947 | 1/1980 | Brower | 266/48 |
| 5,472,174 | 12/1995 | Geasland | 266/48 |

FOREIGN PATENT DOCUMENTS 0005262  2/1978  Japan .

*Primary Examiner*—Scott Kastler
*Attorney, Agent, or Firm*—Bereskin & Parr

[57] ABSTRACT

A metallic pipe may be used as a burning bar if the pipe contains wires. The wires are usually steel but may be combinations of steel wires, aluminum wires, magnesium wires and the like. To use the burning bar one end is heated to at least red hot condition. Oxygen is then pumped down the pipe and the pipe then produces a self-sustaining high temperature, high heat flame. A burning bar may be used for demolition and similar uses. In this improved burning bar, the wires within the pipe are arranged so that the wires do not extend the full length of the pipe. There is a portion of the pipe adjacent to the end of the pipe held by the operator which does not contain any wires. The pipe is thus self extinguishing at the point where the wires cease thereby providing safety to the operator and economic advantages.

10 Claims, 1 Drawing Sheet

SELF-EXTINGUISHING BURNING BAR

FIELD OF THE INVENTION

This invention relates to a cutting torch and in particular, a torch comprising a pipe which will gradually burn off with a flame when oxygen is supplied.

There is a commercial need for relatively large capacity cutting implements which may be used to cut relatively large bodies such as rock, solidified ore, cast iron minerals in the bottom of furnaces and refractory materials including furnaces, smelters and the like. Burning bars of this type are well-known. Typically the burning bar includes a metallic pipe, typically iron or steel, through which oxygen may be pumped. In order to create a sufficiently hot flame the pipe is supplied with other burnable material such as metallic wires.

Varying the metallic nature of the wires can produce improved thermal output. One example is U.S. Pat. No. 3,260,076 issued 1966 to Humberg. Humberg suggests the use of a steel pipe which is filled with a bundle of wires. The filling of the pipe may comprise a magnesium alloy core surrounded by a number of fusible steel wires. Humberg teaches that the flame produced by such a burner pipe is of such a temperature that hard materials such as basalt, marble, ore and fire-clay slags as well as cast iron and concrete bodies can be cut or severed within a relatively short period of time.

With existing burning bars of the type disclosed in Humberg the bar comprises a convenient length of pipe with wires extending through the length of the bar. In order to ignite the bar, the bar is first connected to a source of oxygen so that the oxygen can flow axially along the pipe. The open end of the bar is heated until the pipe wall and the wires contained within the pipe are ignited. Then the flow of oxygen is commenced and the oxygen flow maintains a flame which may be very hot and which may produce a very substantial quantity of heat, in fact, sufficient to melt large bodies of rock and ore.

U.S. Pat. No. 5,458,696 issued October, 1995 and assigned to Southwind Enterprises Inc. discloses a process for cutting large blocks of metals and breaking up refractory structures by means of a very high temperature flame using burning bars of this type. In U.S. Pat. No. 5,468,696 the bar to be used for such process contains rods of mild steel and aluminum within the pipe.

As will be well understood by those familiar with such burning bars, the bar is consumed by the flame. Thus, the bar starts out at a given length and is consumed with the flame becoming closer and closer to the end of the pipe and the source of supply of oxygen. Because the temperature of the flame is high and because the quantity of heat given off by the burning bar is significant there develops a safety issue in how close the flame would be allowed to approach the operator. With bars which have been made heretofore, the choice of when the operator ceases using the bar is a matter of individual choice up to the operator. When the operator decides that the existing bar is now sufficiently short, he extinguishes the flame by turning off the oxygen supply. Depending upon the judgment of the operator a shorter or longer stub of bar may be left when a decision is made to extinguish the bar.

In accordance with the present invention, a burning bar of the type discussed above is self-extinguishing. The burning bar comprises a tubular metallic conduit having a length $L_1$ and is intended for use with a flow of oxygen containing gas intended to flow axially along the conduit. The conduit contains a bundle containing a plurality of metallic wires with the bundle of wires arranged so that one end of the bundle of wires is located adjacent a first end of the conduit. The bundle of wires has an installed length of $L_2$. In the burning bar of this invention, $L_2$ is less than $L_1$.

Further, in accordance with this invention, an improved method for self-extinguishing a burning bar comprises providing a tubular metallic conduit having a length $L_1$ between first and second ends. A bundle of metallic wires is provided within the conduit with the bundle of wires having one end adjacent the first end of the conduit. The bundle of wires has an installed length of $L_2$ and $L_2$ is less than $L_1$. The method further comprises supplying an oxygen containing gas to flow within the conduit toward the first end of the conduit at a rate at least as great as required to support continuous combustion of the pipe and wires. The gas flowing at the aforesaid rate extinguishes combustion of the conduit when the conduit and bundle of wires have burned back a distance substantially equal to $L_2$ from the first end of the conduit.

BRIEF DESCRIPTION OF THE DRAWINGS

A more full understanding of the invention will become apparent to those skilled in the art from a review of the following detailed description of a preferred embodiment of the invention taken in conjunction with the accompanying drawings in which:

FIG. 1 illustrates a burning bar generally at 10. The burning bar 10 includes a steel pipe 12 and a wire bundle 14. The steel pipe 12 comprises a first end 16 and a second end 18. The wire bundle comprises a first end 20 and a second end 22.

Figure 1:
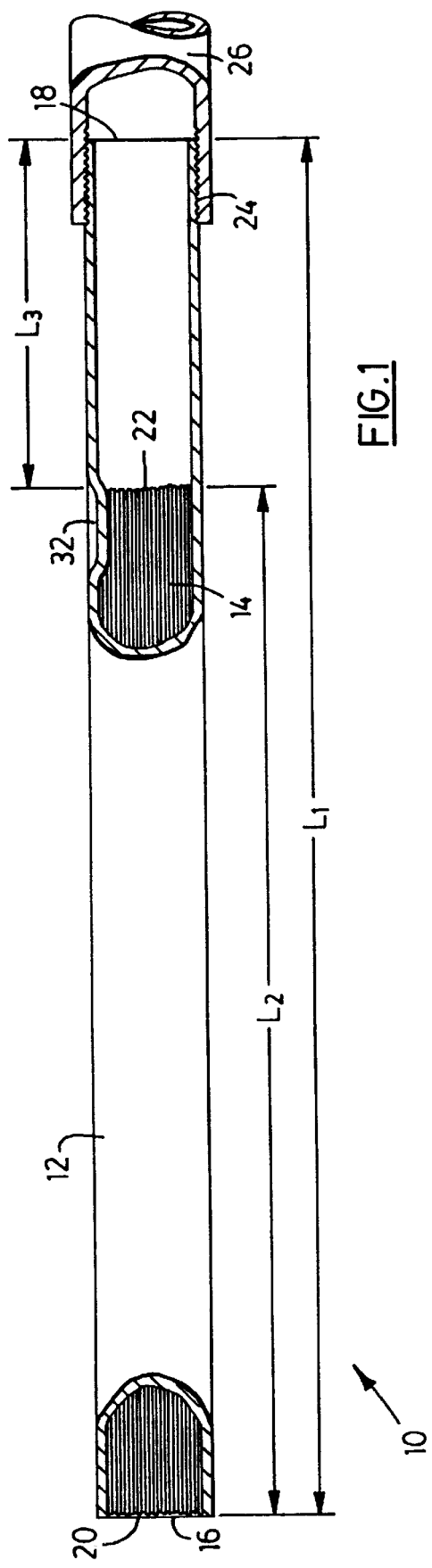
FIG. 1 illustrates a burning bar in accordance with the invention in partial section.

The burning bar shown in FIG. 1 has a length between first and second ends 16 and 18 of $L_1$. The wire bundle has a length between first and second ends 20 and 22 of $L_2$. From reference to FIG. 1 it will be observed that $L_2$ is considerably shorter than $L_1$. This leaves a portion of the steel pipe 12 adjacent second end 18 open; that is, having no wires within that portion. The length of this portion $L_3$ is equal to $L_1-L_2$.

In use, the burning bar 10 is to be connected to a source of oxygen. To facilitate the connection, the burning bar is provided with a thread 24 adjacent second end 18. The burning bar may be then threaded into a fitting 26 having a complimentary thread pattern. The fitting 26 may then be connected to a source or supply of oxygen which is not shown in the Figure. If desired, the fitting 26 may have handles and/or valves to facilitate handling the burning bar in use and to facilitate controlling the flow of oxygen. The pipe 12 serves as a conduit for the flow of oxygen axially along the pipe to the first end. To facilitate the flow of gas, the wire bundle has sufficient open space so it permits relatively free flow of gas.

While the term oxygen has been used herein, it is not necessary that the bar of this invention be utilized with pure industrial oxygen. Any gas which will support combustion may be used.

Figure 2:
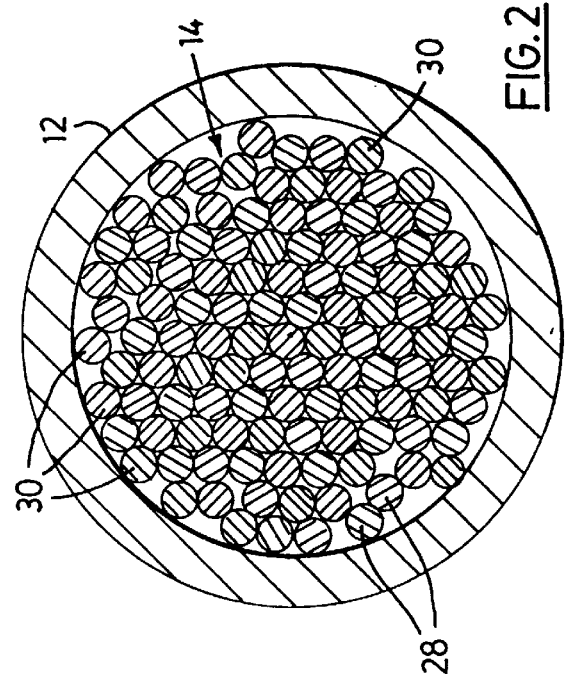
FIG. 2 illustrates a cross-section of the burning bar of FIG. 1.

As shown in FIG. 2, the burning bar 10 is packed with the bundle of wires 14. Advantageously the bundle of wires includes a mixture of steel wires 28 and aluminum wires 30. A mixture of aluminum and steel wires provides for a greater output of heat. To further facilitate maintaining the wires in the burning bar, the burning bar may be crimped as indicated at 32 at approximately a distance $L_2$ from the first end 16 of the steel pipe. The crimp 32 which is adjacent the second end 22 of the wire bundle serves to further hold the wire bundle in place and also provides an external visual indication of the location of the end of the wire bundle.

In order to use the burning bar of FIG. 1, the burning bar is connected to the fitting 26. The end 16 of the steel pipe which coincides with the end 20 of the wire bundle is then heated. Suitable sources for heating may be oxyacetylene torches or pools of molten metal if available, or other readily available sources of significant heat. Once the end of the bundle is raised to near combustion temperatures, oxygen is turned on to flow through the fitting and axially along the pipe, through the wire bundle. When the oxygen reaches the hot end, the oxidation reaction with the metal will occur and produce a flame as well as a large quantity of heat. The oxygen flow rate to maintain combustion involves providing enough oxygen to support combustion of both the wall of the steel pipe 12 and all of the wire bundle 14. Flow rates will usually be above this minimum level. As combustion proceeds, the wall of the steel pipe 12 as well as the metal of the wire bundle will be consumed and the area of combustion will gradually move toward the second end 18 of the steel pipe.

As the pipe and wire bundle is consumed, eventually the area of combustion will become adjacent the second end 18 of the wire bundle 14. As the area of combustion reaches the second end 18 of the wire bundle 14 there will occur an instant in which the flow of oxygen will either consume the last of the wire bundle or discharge small fragments of the ends of the wires forming the wire bundle out of the steel pipe. After the last of the wire bundle has been used up the flow of oxygen which previously had been sufficient to maintain combustion of the pipe and the wires now represents a substantial excess as only the wall of the steel pipe remains in active combustion. It has surprisingly been realized that without the wire bundle within the burning bar, the steel pipe will not maintain combustion even with a flow of oxygen. Rather, there is insufficient material in active combustion to maintain the combustion. Rather, the material cools to the point where the metal of the pipe wall no longer undergoes rapid oxidation and the combustion stops. This produces a "leftover" length of empty conduit having a length $L_3$ which is about equal to $L_1-L_2$.

Once the wire bundle has been consumed by the oxidation process, the bar will not burn any further. Thus, the burning bar becomes self-extinguishing. Accordingly, it is possible to design the point at which the bar will become self-extinguishing under the flow of oxygen which was originally required to maintain combustion. The designer is free to choose the relative proportions of the lengths $L_1$ and $L_2$ to establish the dimension $L_3$ (i.e. $L_1$ minus $L_2$) at which the flame will go out and the process will be stopped.

From a safety point of view, it has been determined that the flame should be allowed to proceed no closer than 18 inches to the end 18 of the steel pipe. This then leaves 18 inches of space between the end of the steel pipe and the intense heat generated by the bar when the combustion process stops.

A further advantage of the burning bar illustrated is that there is an economic saving arising from use of a wire bundle of length $L_2$ which is shorter than $L_1$. As it is desirable for safety reasons that the bar extinguish at least 18 inches from the end 18, then the wire bundle in conventional bars which extends to second end 18 is not consumed. Particularly when the wire bundle comprises a mixture of metals which may be more expensive, including not only steel wires but also aluminum wires or other alloys, significant savings can occur by not utilizing wires in the portion of the bar which is not consumed. It has been found that most preferably that $L_3$, the difference between $L_1$ and $L_2$ is preferably from about 20 inches to about 30 inches. This provides the best compromise between safety and economy.

EXAMPLE 1

A burning bar in accordance with the invention was constructed utilizing a mild steel pipe of outside diameter 0.976 inches and inside diameter 0.750 inches. The pipe had an overall length of 10 foot 6 inches. A bundle of wires was pulled into the pipe. The bundle of wires comprised mild steel rods having 0.125 inch diameter and aluminum rods having 0.12 inches diameter. The aluminum content of the wires packed into the pipe is approximately 31 wt % of the bundle of wires. The bundle of wires was 8 feet 6 inches long. The bundle of wires extended from a first end of the pipe toward the other end leaving approximately two feet of pipe without any wires therein. The pipe was crimped adjacent the end of the wire bundle that is about two feet from second end of the pipe. The second end of the pipe was connected to a source of commercial oxygen. The first end of the burning bar was then heated to red hot and oxygen flow commenced. The flow rate was adjusted to provide continuous combustion. The bar burned and was consumed until the area of combustion of the bar was approximately two feet from the second end of the pipe. At that point the combustion ceased even though no change was made in the oxygen flow. When combustion stopped the oxygen flow was stopped. The bar was examined and it was noted that the remaining length of bar was approximately two feet long and did not contain any of the bundle of wires.

In a subsequent test, the end of a steel pipe was attached to a source of oxygen to flow oxygen axially along the pipe. The other end of the pipe was heated to red hot condition by placing the end of the pipe in a molten pool of metal. Regardless of the quantity of oxygen flowing within the pipe, the pipe did not self-sustain combustion. This test showed that regardless of the quantity of flow of oxygen axially along the pipe, a hollow pipe will not self-sustain combustion without continual additional supply of thermal energy.

In accordance with this invention, a burning bar thus comprises a self-extinguishing feature. The bar can be burned by the operator back to the design point. Once the design point is reached the bar will self-extinguish. The scrap then left is a hollow steel pipe without any of the internal bundle of wires. The design point can be established anywhere along the length of the bar by arranging a length of the bundle of wires.

The bundle of wires are advantageously pulled into the pipe and thus are straight. There is however no requirement that the individual wires of the bundle be parallel to the pipe axis. If desired or convenient, depending upon the supply of wires available, the wires could be crimped, kinked or coiled or the like. It is the presence or absence of the wires which causes the combustion to cease. In this description and claims the length of the bundle is referred to as the installed length as the length of the individual wires and their configuration is not a limiting feature of the invention.

This invention has been described in connection with a preferred embodiment. Various modification may be made by those skilled in the art. The invention is not to be limited to this preferred embodiment but only by the scope of the following claims.

I claim:

1. A self extinguishing burning bar for use with a flow of oxygen containing gas internally of said bar, said bar comprising: a tubular metallic conduit having a first end, a second end and a length $L_1$, said second end of said conduit having coupling means to attach said second end of said conduit to a source of oxygen containing gas, a bundle of metallic wires contained within said conduit, said bundle of wires arranged so that one end of said bundle of wires is located adjacent said first end of said conduit, said bundle of wires having an installed length of $L_2$, and wherein $L_2$ is less than $L_1$.

2. A burning bar in accordance with claim 1 wherein said conduit is steel, and said wires are made of m aterials selected from the group consisting of iron, steel, aluminum and magnesium.

3. A burning bar in accordance with claim 2 wherein said bundle of wires in said conduit are packed in said conduit so as to provide substantially unimpeded flow of said oxygen containing gas along said conduit from said second end to said first end.

4. The burning bar of claim 3 wherein said bundle of wires includes wires made of steel and wires made of aluminum.

5. The burning bar of claim 2, said bar comprising a crimped section, said crimped section spaced from said first end of said bar a distance approximately equal to $L_2$.

6. The burning bar of claim 2 wherein the difference between $L_1$ and $L_2$ is $L_3$ and $L_3$ is at least 18 inches.

7. The burning bar of claim 6, wherein $L_3$ is from about 20 inches to 30 inches.

8. A process for self extinguishing a burning bar comprising:

providing a tubular metallic conduit having a length $L_1$ ;

providing a bundle of metallic wires within said conduit, with said bundle of wires having one end adjacent a first end of said conduit, said bundle of wires having an installed length of $L_2$, and wherein $L_2$ is less than $L_1$;

supplying an oxygen containing gas to flow within said conduit toward said first end of said conduit, at a rate at least as great as required to support continuous combustion of said pipe and said wires, so that said gas flowing at said rate extinguishes combustion of said conduit when said conduit and said wires have burned back a distance substantially equal to $L_2$ from said first end.

9. The process of claim 8, wherein the length of said bar when said combustion is extinguished is at least 18 inches.

10. A self extinguishing burning bar for use with a flow of oxygen containing gas internally of said bar, said bar comprising: a tubular metallic conduit having a length $L_1$, a bundle of metallic wires contained within said conduit, said bundle of wires arranged so that one end of said bundle of wires is located adjacent a first end of said conduit, said bundle of wires having an installed length of $L_2$, and $L_2$ is less than $L_1$, wherein said conduit is steel, and said wires are made of materials selected from the group consisting of iron, steel, aluminum and magnesium, said bar comprising a crimped section, said crimped section spaced from said first end of said bar a distance approximately equal to $L_2$.

* * * * *